(12) United States Patent  
Mizutani

(10) Patent No.: US 9,307,098 B2
(45) Date of Patent: Apr. 5, 2016

(54) IMAGE RECORDING APPARATUS AND IMAGE RECORDING METHOD

(71) Applicant: SEIKO EPSON CORPORATION, Tokyo (JP)

(72) Inventor: Seigo Mizutani, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/617,032

(22) Filed: Feb. 9, 2015

(65) Prior Publication Data
US 2015/0256688 A1  Sep. 10, 2015

(30) Foreign Application Priority Data

Mar. 10, 2014 (JP) .................................. 2014-045992

(51) Int. Cl.
| G06F 15/00 | (2006.01) |
| G06K 1/00 | (2006.01) |
| H04N 1/00 | (2006.01) |
| B41J 29/38 | (2006.01) |
| G06K 15/16 | (2006.01) |

(52) U.S. Cl.
CPC ............ *H04N 1/00092* (2013.01); *B41J 29/38* (2013.01); *H04N 1/00665* (2013.01); *G06K 15/16* (2013.01)

(58) Field of Classification Search
None
See application file for complete search history.

(56) References Cited

U.S. PATENT DOCUMENTS

| 5,172,989 | A | * | 12/1992 | Imaseki | B41J 13/076 242/419.9 |
| 5,781,823 | A | * | 7/1998 | Isobe | B41J 3/44 347/3 |
| 6,297,840 | B1 | * | 10/2001 | Inana | B41J 2/32 347/175 |
| 7,618,140 | B2 | * | 11/2009 | Kato | B41J 11/003 271/10.1 |
| 7,628,467 | B2 | * | 12/2009 | Silverbrook | B41J 2/01 347/105 |
| 7,664,454 | B2 | * | 2/2010 | Ishikuro | G03G 15/231 271/270 |
| 8,573,591 | B2 | * | 11/2013 | Motoyama | H04N 1/0057 194/207 |
| 2002/0054305 | A1 | * | 5/2002 | Ogasahara | B41J 2/2132 358/1.8 |
| 2005/0051011 | A1 | * | 3/2005 | Onishi | B26D 1/035 83/428 |

(Continued)

FOREIGN PATENT DOCUMENTS

| JP | 2006-088612 A | 4/2006 |
| JP | 2013-119167 A | 6/2013 |

(Continued)

*Primary Examiner* — Madelein Nguyen
(74) *Attorney, Agent, or Firm* — Global IP Counselors, LLP

(57) ABSTRACT

There is provided a transport section configured to transport a recording medium in a first direction and a second direction which is a reverse of the first direction, a head configured to record an image on the recording medium, a first sensor arranged on a downstream side of the head in the first direction and configured to detect presence or absence of abnormality on the recording medium, and a control section configured to execute an operation where the image is recorded on the recording medium using the head while the recording medium is being transported in the first direction by the transport section and an operation where the recording medium is transported in the second direction by the transport section.

7 Claims, 4 Drawing Sheets

(56) References Cited

U.S. PATENT DOCUMENTS

| | | | | |
|---|---|---|---|---|
| 2006/0170750 | A1* | 8/2006 | Takeshita | B41J 3/4071 347/104 |
| 2007/0055724 | A1* | 3/2007 | Harada | B41J 11/46 708/800 |
| 2007/0071524 | A1* | 3/2007 | Nakamura | G03G 15/234 399/341 |
| 2009/0231605 | A1* | 9/2009 | Kuwahara | B41J 29/393 358/1.9 |
| 2009/0231621 | A1* | 9/2009 | Kuwahara | B41J 29/02 358/1.15 |
| 2009/0231623 | A1* | 9/2009 | Kuwahara | B41J 29/02 358/1.15 |
| 2010/0061743 | A1* | 3/2010 | Uematsu | G03G 15/234 399/38 |
| 2010/0182392 | A1* | 7/2010 | Nagumo | B41J 2/45 347/237 |
| 2011/0056799 | A1* | 3/2011 | Eoka | B65H 29/008 198/464.2 |
| 2011/0103865 | A1* | 5/2011 | Aoki | B41J 3/60 400/578 |
| 2012/0286464 | A1* | 11/2012 | Takei | B41J 29/023 271/4.01 |
| 2013/0265362 | A1 | 10/2013 | Toya | |
| 2013/0278665 | A1* | 10/2013 | Imamura | B41J 13/0009 347/16 |
| 2014/0292880 | A1* | 10/2014 | Arimori | B41J 29/393 347/16 |
| 2015/0085303 | A1* | 3/2015 | Okumura | G06K 15/4065 358/1.5 |
| 2015/0166282 | A1* | 6/2015 | Shirane | B65H 1/04 358/1.15 |

FOREIGN PATENT DOCUMENTS

| | | |
|---|---|---|
| JP | 2013-215983 A | 10/2013 |
| JP | 2013-220645 A | 10/2013 |

\* cited by examiner

IMAGE RECORDING APPARATUS AND IMAGE RECORDING METHOD

CROSS-REFERENCE TO RELATED APPLICATIONS

This application claims priority to Japanese Patent Application No. 2014-045992 filed on Mar. 10, 2014. The entire disclosure of Japanese Patent Application No. 2014-045992 is hereby incorporated herein by reference.

BACKGROUND

1. Technical Field

The present invention relates to an image recording apparatus and an image recording method where an image is recorded on a recording medium and particularly relates to a technique for detecting abnormalities which are on the recording medium.

2. Related Art

Japanese Unexamined Patent Application Publication No. 2013-215983 describes a printer which records an image on a recording medium by discharging ink from a head which opposes the recording medium while the recording medium is being transported from a paper feeding unit toward a winding unit. In the printer which records an image on the recording medium using the head in this manner as designated in Japanese Unexamined Patent Application Publication No. 2013-215983, there is a concern about a paper jam with the recording medium or abnormalities such as dust colliding with the head. In order to cope with this, the printer in Japanese Unexamined Patent Application Publication No. 2013-215983 is provided with a sensor which detects the presence or absence of abnormalities on the recording medium.

Here, there are cases where there are abnormalities on the recording medium where an image is recorded as will be described later. In contrast to this, the recording medium where an image is recorded is sent from the head to the winding unit side in the image recording apparatus (the printer) described above where the recording medium is transported from the paper feeding unit in a certain direction toward the winding unit. For this reason, abnormalities do not pass under the head and there is no particular problem. However, depending on the image recording apparatus, it is possible to transport the recording medium in a direction (a reverse transporting direction) which is the reverse of a direction (a forward transporting direction) in which the recording medium is transported when recording an image. It is assumed that there are also cases where abnormalities, which are on the recording medium where an image is recorded, pass under the head in the image recording apparatus and problems are possible. Therefore, it is suitable if it is possible to confirm the presence or absence of abnormalities.

SUMMARY

The invention is carried out to solve the problems described above and it is the object of the invention to provide an image is recorded in an image recording apparatus and an image recording method where an image is recorded on a recording medium with a technique such that it is possible to confirm the presence or absence of abnormalities on a recording medium.

In order to realize the object described above, an image recording apparatus according to an aspect of the invention is provided with a transport section configured to transport a recording medium in a first direction and a second direction which is a reverse of the first direction, a head configured to record an image on the recording medium, a first sensor arranged on a downstream side of the head in the first direction and configured to detect presence or absence of an abnormality on the recording medium, and a control section configured to execute an operation where the image is recorded on the recording medium using the head while the recording medium is being transported in the first direction by the transport section and an operation where the recording medium is transported in the second direction by the transport section.

In order to realize the object described above, an image recording method according to an aspect of the invention includes recording an image on a recording medium using a head while the recording medium is being transported in a first direction and transporting the recording medium in a second direction which is a reverse of the first direction. Presence or absence of an abnormality on the recording medium is detected by a sensor arranged on a downstream side of the head in the first direction during the transporting of the recording medium in the second direction.

The present invention (the image recording apparatus and the image recording method) which is configured in this manner records an image on the recording medium using the head while the recording medium is being transported in the first direction. Accordingly, the recording medium where an image is recorded is sent to the downstream side of the head in the first direction. In contrast to this, the sensor (a first sensor) which detects the presence or absence of abnormalities on the recording medium is arranged on the downstream side of the head in the first direction. Accordingly, it is possible to detect abnormalities, which are on the recording medium where an image is recorded, using the sensor (the first sensor). By doing this, in the present invention, it is possible to confirm the presence or absence of abnormalities on the recording medium where an image is recorded.

Here, "abnormality" in the present specification is a concept which includes at least one of wrinkling, folding, tearing, ripping, or scuffing of the recording medium, solidifying of liquid, such as ink which does not configure an image, which adheres to the recording medium, or dust which adheres to the recording medium.

At this time, the image recording apparatus may be configured so that the head is configured to record an image on a first surface of the recording medium, and the first sensor is configured to detect the presence or absence of the abnormality on the recording medium at a side of a side of a second surface which is a reverse of the first surface of the recording medium. That is, abnormalities, where colliding with the head is a problem, are abnormalities which appear on the first surface of the recording medium where recording of an image is executed, and it is possible to detect abnormalities which are wrinkling, folding, or tearing of the recording medium at the second surface side of the recording medium (that is, the reverse side to the first surface where an image is recorded) using the first sensor. Moreover, it is advantageous in that it is possible to eliminate the effects which are imparted by an image, which is recorded on the first surface of the recording medium, on the detection precision of the first sensor due to the presence or absence of abnormalities being detected on the second surface of the recording medium.

In addition, the image recording apparatus may be configured so as to be provided with a second sensor arranged on an upstream side of the head in the first direction and configured to detect the presence or absence of the abnormality on the recording medium at a side of the first surface of the recording medium. With this configuration, it is possible to detect the presence or absence of abnormalities on the recording medium where an image is not recorded using the second sensor.

In addition, the image recording apparatus may be configured so that the control section is further configured to stop transporting of the recording medium when the first sensor detects the abnormality on the recording medium while executing the operation where the recording medium is transported in the second direction by the transport section. With this configuration, it is possible to suppress colliding of abnormalities, which are on the recording medium where an image is recorded, with the head.

In addition, the image recording apparatus may be configured so that the control section is further configured to perform notifying of a user when the first sensor detects the abnormality on the recording medium while executing the operation where the recording medium is transported in the second direction by the transport section. With this configuration, it is possible for a user to ascertain that there are abnormalities on the recording medium where an image is recorded and appropriately execute a necessary process.

In addition, the image recording apparatus may be configured so as to be provided with a pair of rollers configured to interpose the recording medium at a downstream side of the first sensor in the first direction. That is, there is a concern that there will be abnormalities such as wrinkling on the recording medium when the recording medium where an image is recorded is interposed by the pair of rollers. Therefore, it is particularly suitable if the image recording apparatus is configured so that it is possible to confirm the presence or absence of abnormalities on the recording medium where an image is recorded by adopting the present invention.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
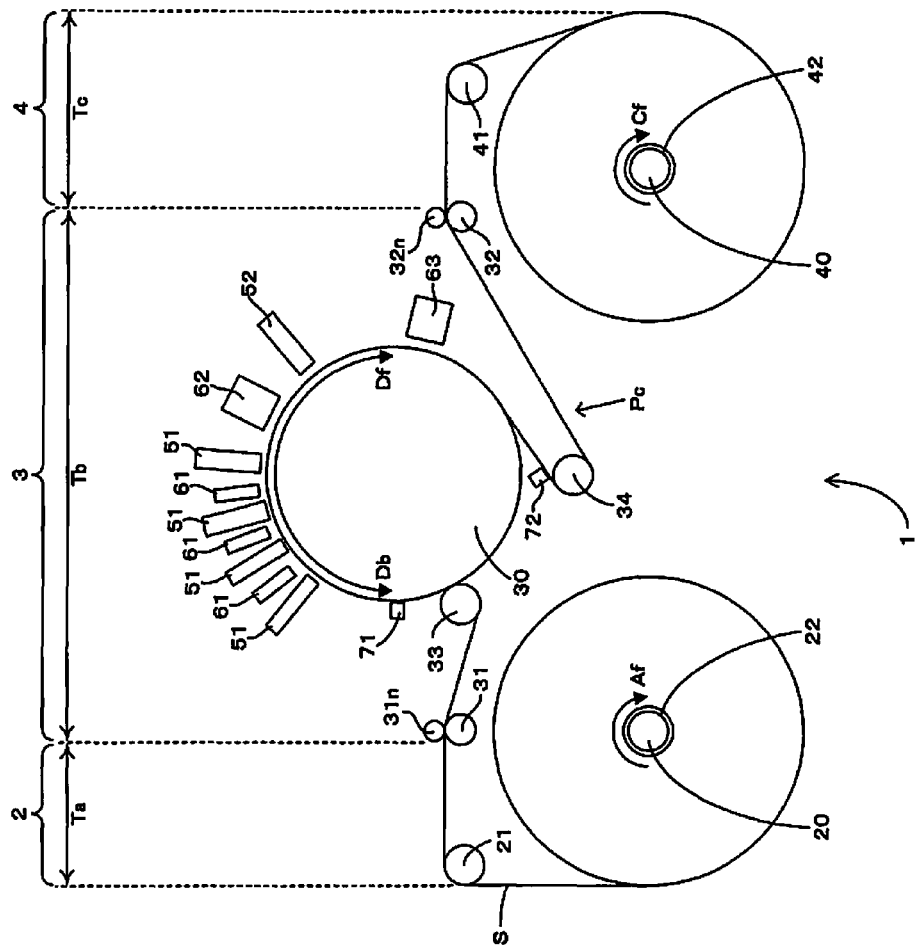
FIG. 1 is front surface diagram illustrating an example of an apparatus configuration where a printer which is able to execute the present invention is provided.

FIG. 1 is front surface diagram schematically illustrating an example of an apparatus configuration where a printer which is able to execute the present invention is provided. In a printer 1 as shown in FIG. 1, one sheet S (a web), where both ends are wound around a feeding shaft 20 and a winding shaft 40 in a roll shape, is stretched along a transport path Pc, and the sheet S receives image forming while being transported from the feeding shaft 20 toward the winding shaft 40 in a transport direction Df. The types of base material for the sheet S are broadly classified into paper-based and film-based. As specific examples, there is high quality paper, cast paper, art paper, coated paper and the like as paper-based base material, and there is synthetic film, PET (polyethylene terephthalate) film, PP (polypropylene) film, and the like as film-based base material. In summary, the printer 1 is provided with a feeding section 2 (a feeding region) where the sheet S is fed from the feeding shaft 20, a processing section 3 (a processing region) where an image is recorded on the sheet S which is fed from the feeding shaft 20, and a winding section 4 (a winding region) where the sheet S, where an image is recorded using the processing section 3, is wound onto the winding shaft 40. Here, out of both surfaces of the sheet S, a surface where an image is recorded is referred to as a front surface and a surface which is on the reverse side to the front surface is referred to as a rear surface in the description below.

The feeding section 2 has the feeding shaft 20 around which one end of the sheet S is wound and a driven roller 21 around which the sheet S, which is drawn out from the feeding shaft 20, is wrapped. The feeding shaft 20 supports an end of the sheet S by the sheet S being wound around the feeding shaft 20 in a state where the front surface of the sheet S faces to the outer side. Then, the sheet S which is wound around the feeding shaft 20 is fed to the processing section 3 via the driven roller 21 due to the feeding shaft 20 rotating in a rotation direction Af (clockwise in FIG. 1). That is, the sheet S is wound around the feeding shaft 20 via a core tube 22 which is able to be attached to and detached from the feeding shaft 20. Accordingly, when the sheet S on the feeding shaft 20 is used up, it is possible to replace the sheet S on the feeding shaft 20 due to the new core tube 22, around which the sheet S is wound in a roll shape, being mounted onto the feeding shaft 20.

The processing section 3 records an image on the sheet S while supporting the sheet S, which is fed from the feeding section 2, using a rotation drum 30 by appropriately performing processing using each of functional sections 51, 52, 61, 62, and 63 which are arranged along the outer circumference surface of the rotation drum 30. In the processing section 3, the front driving roller 31 and the rear driving roller 32 are provided on either side of the rotation drum 30, and image recording is received due to the sheet S, which is transported from the front driving roller 31 to the rear driving roller 32 toward the transport direction Df, being supported by the rotation drum 30.

The front driving roller 31 has a plurality of micro-protrusions which are formed by spray coating on the outer circumference surface, and the sheet S, which is fed out from the feeding section 2, is wrapped around the front driving roller 31 from the rear surface side. Then, the front driving roller 31 transports the sheet S, which is fed out from the feeding section 2, to the downstream side in the transport direction Df due to being rotated in the clockwise direction in FIG. 1. Here, a nip roller 31*n* (a driven roller) is provided with regard to the front driving roller 31. The nip roller 31*n* abuts with the front surface of the sheet S which is in a state of being pushed to the front driving roller 31 side, and the sheet S is interposed between the nip roller 31*n* and the front driving roller 31. Due to this, it is possible to secure frictional force between the front driving roller 31 and the sheet S and reliably perform transporting of the sheet S using the front driving roller 31.

The rotation drum 30 is a cylindrical drum with a diameter of, for example, 400 (mm) which is supported by a support mechanism, which is omitted from the diagrams, so as to be able to rotate in both directions of the transport direction Df and a reverse direction Db which is the reverse of the transport direction Df, and the sheet S, which is transported from the front driving roller 31 to the rear driving roller 32, is wrapped around the rotation drum 30 from the rear surface side. The sheet S is rotated by being driven by the rotation drum 30 due to receiving frictional force between the sheet S and the rotation drum 30 and the sheet S is supported by the rotation drum 30 from the rear surface side. That is, driven rollers 33 and 34 which bend back the sheet S are provided in the processing section 3 at a section for wrapping around the rotation drum 30. Out of the driven rollers, the driven roller 33 bends back the sheet S due to the front surface of the sheet S being wrapped around between the front driving roller 31 and the rotation drum 30. On the other hand, the driven roller 34 bends back the sheet S due to the front surface of the sheet S being wrapped around between the rotation drum 30 and the rear driving roller 32. In this manner, it is possible to secure the section for wrapping the sheet S around the rotation drum 30 which is long due to the sheet S being bent back at each of the upstream side and the downstream side of the transport direction Df with regard to the rotation drum 30.

The rear driving roller 32 has a plurality of micro-protrusions which are formed by spray coating on the outer circumference surface, and the sheet S, which is transported from the rotation drum 30 via the driven roller 34, is wrapped around the rear driving roller 32 from the rear surface side. Then, the rear driving roller 32 transports the sheet S to the winding section 4 which is on the downstream side in the transport direction Df due to being rotated in the clockwise direction in FIG. 1. Here, a nip roller 32n (a driven roller) is provided with regard to the rear driving roller 32. The nip roller 32n abuts with the front surface of the sheet S which is in a state of being pushed to the rear driving roller 32 side, and the sheet S is interposed between the nip roller 32n and the rear driving roller 32. Due to this, it is possible to secure frictional force between the rear driving roller 32 and the sheet S and reliably perform transporting of the sheet S using the rear driving roller 32.

In this manner, the sheet S, which is transported from the front driving roller 31 to the rear driving roller 32, is supported on the outer circumference surface of the rotation drum 30. Then, a plurality of recording heads 51, which correspond to colors which are each different to each other, are provided in the processing section 3 in order to record color images with regard to the front surface of the sheet S which is supported on the rotation drum 30. In detail, four of the recording heads 51 which correspond to yellow, cyan, magenta, and black are lined up in the transport direction Df in this color order. Each of the recording heads 51 are opposed with regard to the front surface of the sheet S which is wrapped around the rotation drum 30 with an opening of a slight clearance and discharge an ink of the corresponding color (color ink) from nozzles using an ink jet system. Then, a color image is formed on the front surface of the sheet S due to each of the recording heads 51 discharging ink with regard to the sheet S which is being transported in the transport direction Df.

That is, UV (ultraviolet) ink (photo-curable ink) which is cured by irradiating ultraviolet rays (light) is used as the ink. Therefore, UV irradiating devices 61 and 62 (an irradiating section) are provided in the processing section 3 in order to cure and fix ink onto the sheet S. Here, curing of ink is executed by being separated into two stages of temporary curing and main curing. The UV irradiating devices 61 for temporary curing are arranged between each of the plurality of recording heads 51. That is, curing (temporary curing) is carried out on the ink to the extent that wetting and spreading of ink is sufficiently slow compared to a case where ultraviolet rays are not irradiated due to the UV irradiating devices 61 irradiating ultraviolet rays with a weak irradiating intensity, and main curing is not carried out on the ink. On the other hand, the UV irradiating device 62 for main curing is provided at the downstream side with regard to the plurality of recording heads 51 in the transport direction Df. That is, the UV irradiating device 62 carries out curing (main curing) to the extent that wetting and spreading of ink is stopped by irradiating ultraviolet rays with a stronger irradiating intensity than the UV irradiating devices 61.

In this manner, the UV irradiating devices 61 which are arranged between each of the plurality of recording heads 51 carry out temporary curing on the color ink which is discharged onto the sheet S from the recording heads 51 on the upstream side in the transport direction Df. Accordingly, temporary curing is carried out on the ink, which is discharged by one of the recording heads 51 onto the sheet S, until the sheet S reaches the recording head 51 which is adjacent to the one of the recording heads 51 on the downstream side in the transport direction Df. Due to this, generating of color mixing, where color inks with colors which are different are mixed, is suppressed. In a state where color mixing is suppressed by doing this, a color image is formed on the sheet S by the plurality of recording heads 51 discharging color inks with colors which are different to each other. Furthermore, the UV irradiating device 62 for main curing is provided more to the downstream side in the transport direction Df than the plurality of recording heads 51. For this reason, the color image which is formed by the plurality of recording heads 51 is fixed to the sheet S due to main curing being carried out using the UV irradiating device 62.

Furthermore, a recording head 52 is provided at the downstream side with regard to the UV irradiating device 62 in the transport direction Df. The recording head 52 is opposed with regard to the front surface of the sheet S which is wrapped around the rotation drum 30 with an opening of a slight clearance and discharges transparent UV ink from nozzles using an ink jet system. That is, transparent ink is further discharged with regard to the color image which is formed by the recording heads 51 which constitute the four colors. The transparent ink is discharged onto the entire surface of the color image and the texture of a gloss finish or a mat finish is imparted to the color image. In addition, a UV irradiating device 63 (an irradiating section) is provided on the downstream side with regard to the recording head 52 in the transport direction Df. The UV irradiating device 63 carries out main curing on transparent ink which is discharged from the recording head 52 by irradiating strong ultraviolet rays. Due to this, it is possible to fix transparent ink to the front surface of the sheet S.

In this manner, a color image, which is coated with transparent ink, is formed in the processing section 3 by appropriately executing discharge and curing of ink with regard to the sheet S which is wrapped around the outer circumference section of the rotation drum 30. Then, the sheet S where the color image is formed is transported to the winding section 4 by the rear driving roller 32.

Other than the winding shaft 40 around which an end of the sheet S is wound, the winding section 4 has a driven roller 41, around which the sheet S is wrapped from the rear surface side, between the winding shaft 40 and the rear driving roller 32. The winding shaft 40 supports an end of the sheet S by the sheet S being wound onto the winding shaft 40 in a state where the front surface of the sheet S faces to the outer side. That is, the sheet S, which is being transported from the rear driving roller 32, is wound onto the winding shaft 40 via the driven roller 41 when the winding shaft 40 rotates in a rotation direction Cf (clockwise in FIG. 1). That is, the sheet S is wound onto the winding shaft 40 via a core pipe 42 which is able to be attached to and detached from the winding shaft 40. Accordingly, it is possible to remove the sheet S with the whole of the core pipe 42 when the winding shaft 40 is filled up by the sheet S which is wound onto the winding shaft 40.

In addition, the printer 1 of the present embodiment is provided with abnormality sensors 71 and 72 which detect the presence or absence of abnormalities on the sheet S. The abnormality sensor 71 opposes the front surface of the sheet S by being arranged more to the upstream side in the transport direction Df (the forward transporting direction) than the recording heads 51 and 52. Then, the abnormality sensor 71 detects the presence or absence of abnormalities, which are on the sheet S before an image is recorded by the recording heads 51 and 52, on the front surface side of the sheet S. On the other hand, the abnormality sensor 72 opposes the rear surface of the sheet S by being is arranged more to the downstream side in the transport direction Df than the recording heads 51 and 52. Then, the abnormality sensor 72 detects the presence or absence of abnormalities, which are on the sheet S where an image is recorded by the recording heads 51 and 52, on the rear surface side of the sheet S.

Figure 2:
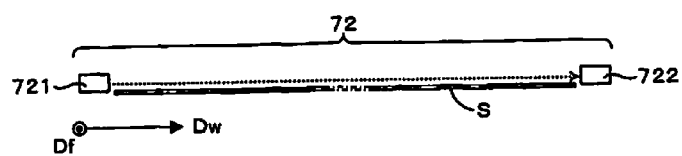
FIG. 2 is a diagram illustrating an example of a configuration of an abnormality sensor.

FIG. 2 is a diagram schematically illustrating an example of a configuration of an abnormality sensor. Here, describing of only the abnormality sensor 72 will be performed since the abnormality sensors 71 and 72 are equipped with a common configuration. The abnormality sensor 72 has a light emitting section 721 which irradiates light and a light receiving section 722 which receives light. The light emitting section 721 is arranged at one side of the sheet S and the light receiving section 722 is arranged at the other side of the sheet S in a width direction Dw of the sheet S (a direction which is orthogonal to the transport direction DO, and the light emitting section 721 and the light receiving section 722 oppose each other in the width direction Dw. Accordingly, when there are no abnormalities on the sheet S between the light emitting section 721 and the light receiving section 722, light which is radiated from the light emitting section 721 reaches the light receiving section 722 after progressing along the sheet S and the light receiving section 722 outputs a first level signal. On the other hand, when there is an abnormality on the sheet S between the light emitting section 721 and the light receiving section 722, at least a portion of light which is radiated from the light emitting section 721 does not reach the light receiving section 722 due to being blocked by the abnormality and the light receiving section 722 outputs a second level signal which is smaller than the first level signal. By doing this, the abnormality sensor 72 outputs signals with different levels from the light emitting section 721 in accordance with the presence or absence of abnormalities on the sheet S.

Figure 3:
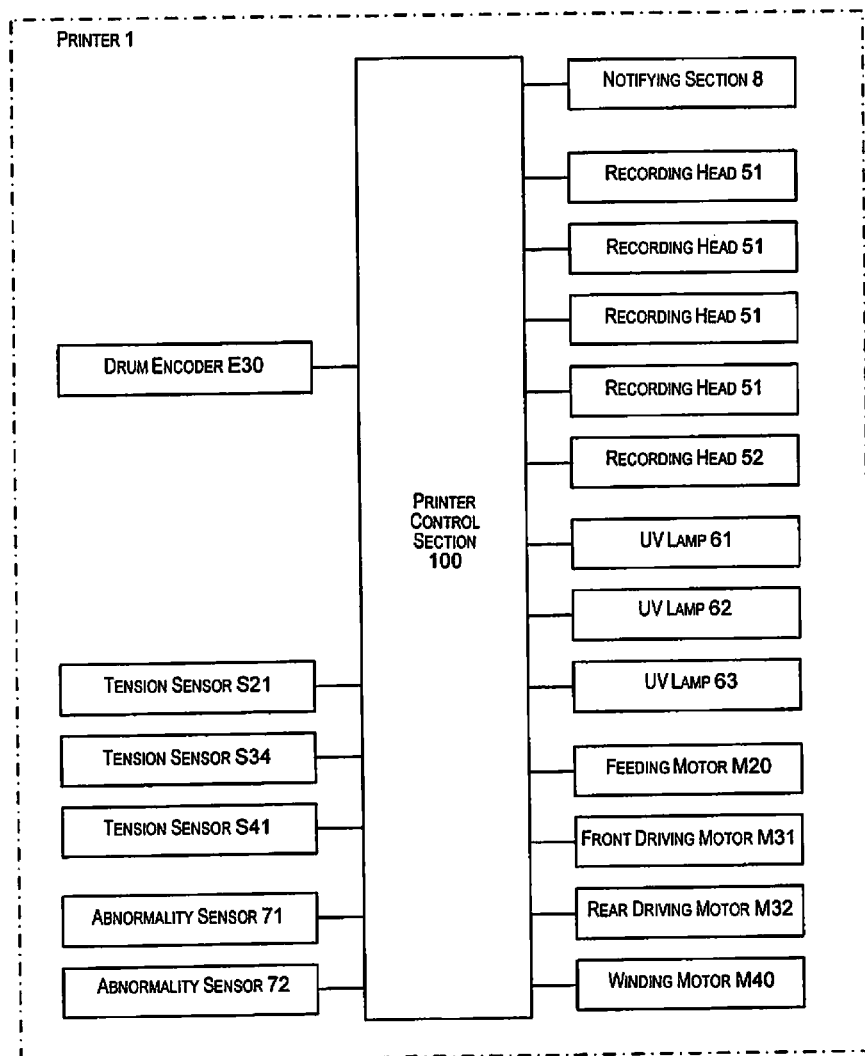
FIG. 3 is a block diagram illustrating an example of an electrical configuration which controls the printer shown in FIG. 1.

The above description is a summary of the apparatus configuration of the printer 1. Next, describing of an electrical configuration which controls the printer 1 will be performed. FIG. 3 is a block diagram schematically illustrating an example of the electrical configuration which controls the printer shown in FIG. 1. A printer control section 100 which controls each section of the printer 1 is provided in the printer 1. Then, each apparatus section of the recording heads, UV irradiating devices, and a sheet transporting system are controlled by the printer control section 100. The details of controlling by the printer control section 100 with regard to each of the apparatus sections are as follows.

The printer control section 100 controls the timing for discharging ink for each of the recording heads 51, which form a color image, according to transporting of the sheet S. In detail, controlling of the timing for discharging ink is executed based on output (detection values) from a drum encoder E30 which is attached to the rotation shaft of the rotation drum 30 and detects the rotation position of the rotation drum 30. That is, it is possible to ascertain the transport position of the sheet S by referencing the output of from the drum encoder E30 which detects the rotation position of the rotation drum 30 since the rotation drum 30 is rotated by being driven to accompany transporting of the sheet S. Therefore, the printer control section 100 forms a color image due to ink which is discharged by each of the recording heads 51 landing at target positions on the sheet S which is being transported by generating a pts (a print timing signal) signal from the output of the drum encoder E30 and controlling the timing for discharging ink for each of the recording heads 51 based on the pts signal.

In addition, the timing where the recording head 52 discharges transparent ink is also controlled in the same manner by the printer control section 100 based on output from the drum encoder E30. Due to this, it is possible to precisely discharge transparent ink with regard to a color image which is formed by the plurality of recording heads 51. Furthermore, the timings of turning on and off of the UV irradiating devices 61, 62, and 63, and the amount of irradiated light are also controlled by the printer control section 100.

In addition, the printer control section 100 administers a function for transporting the sheet S which will be described later using FIG. 1. That is, out of members which configure the sheet transporting system, the feeding shaft 20, the front driving roller 31, the rear driving roller 32, and the winding shaft 40 are respectively connected to motors. Then, the printer control section 100 controls transporting of the sheet S by controlling the speed or torque of the respective motors while rotating the motors. The details of controlling transporting of the sheet S is as follows.

The printer control section 100 rotates a feeding motor M20 which drives the feeding shaft 20 and supplies the sheet S from the feeding shaft 20 to the front driving roller 31. At this time, the printer control section 100 adjusts the tension (a feeding tension Ta) on the sheet S from the feeding shaft 20 to the front driving roller 31 by controlling the torque of the feeding motor M20. That is, a tension sensor S21 which detects the size of the feeding tension Ta is attached to the driven roller 21 which is arranged between the feeding shaft 20 and the front driving roller 31. It is possible for the tension sensor S21 to be configured by, for example, a load cell which detects the size of a force which is received from the sheet S. Then, the printer control section 100 adjusts the feeding tension Ta on the sheet S by carrying out feedback control on the torque of the feeding motor M20 based on detection results (detection values) from the tension sensor S21.

In addition, the printer control section 100 rotates a front driving motor M31 which drives the front driving roller 31 and a rear driving motor M32 which drives the rear driving roller 32. Due to this, the sheet S which is fed out from the feeding section 2 passes through the processing section 3. At this time, speed control is executed with regard to the front driving motor M31 and torque control is executed with regard to the rear driving motor M32. That is, the printer control section 100 adjusts the rotation speed of the front driving motor M31 to a certain speed based on encoder output from the front driving motor M31. Due to this, the sheet S is transported at a certain speed by the front driving roller 31.

On the other hand, the printer control section 100 adjusts the tension (a processing tension Tb) on the sheet S from the front driving roller 31 to the rear driving roller 32 by controlling the torque of the rear driving motor M32. That is, a tension sensor S34 which detects the size of the processing tension Tb is attached to the driven roller 34 which is arranged between the rotation drum 30 and the rear driving roller 32. It is possible for the tension sensor S34 to be configured by, for example, a load cell which detects the size of a force which is received from the sheet S. Then, the printer control section 100 adjusts the processing tension Tb on the sheet S by carrying out feedback control on the torque of the rear driving motor M32 based on detection results (detection values) from the tension sensor S34.

In addition, the printer control section 100 rotates a winding motor M40 which drives the winding shaft 40 and the sheet S, which is transported by the rear driving roller 32, is wound onto the winding shaft 40. At this time, the printer control section 100 adjusts the tension (a winding tension Tc) on the sheet S from the rear driving roller 32 to the winding shaft 40 by controlling the torque of the winding motor M40. That is, a tension sensor S41 which detects the size of the winding tension Tc is attached in the driven roller 41 which is arranged between the rear driving roller 32 and the winding shaft 40. It is possible for the tension sensor S41 to be configured by, for example, a load cell which detects the size of a force which is received from the sheet S. Then, the printer control section 100 adjusts the winding tension Tc on the sheet S by carrying out feedback control on the torque of the winding motor M40 based on detection results (detection values) from the tension sensor S41.

In this manner, the printer control section 100 records an image on the sheet S using the recording heads 51 and 52 while transporting the sheet S from the feeding shaft 20 toward the winding shaft 40 in the transport direction Df. In addition, it is possible for the printer control section 100 to execute not only forward transporting where the sheet S is transported in the transport direction Df but also reverse transporting where the sheet S is transported from the winding shaft 40 toward the feeding shaft 20 in the transport direction Db (the reverse transport direction, that is, the direction which is the reverse of the transport direction DO. In detail, by controlling each of the motors M20, M31, M34, and M40, the printer control section 100 executes reverse transporting by rotating in a direction which is the reverse of a case of forward transporting of the feeding shaft 20, the front driving roller 31, the rear driving roller 32 and the winding shaft 40. It is possible to execute reverse transporting with various objects such as proposed in Japanese Unexamined Patent Application Publication No. 2013-129062, and reverse transporting is executed in order to form a new image which is adjacent to the image which is already formed on the sheet S by, for example, appropriately returning the sheet S to the feeding shaft 20 side when restarting image recording which is interrupted.

Figure 4:
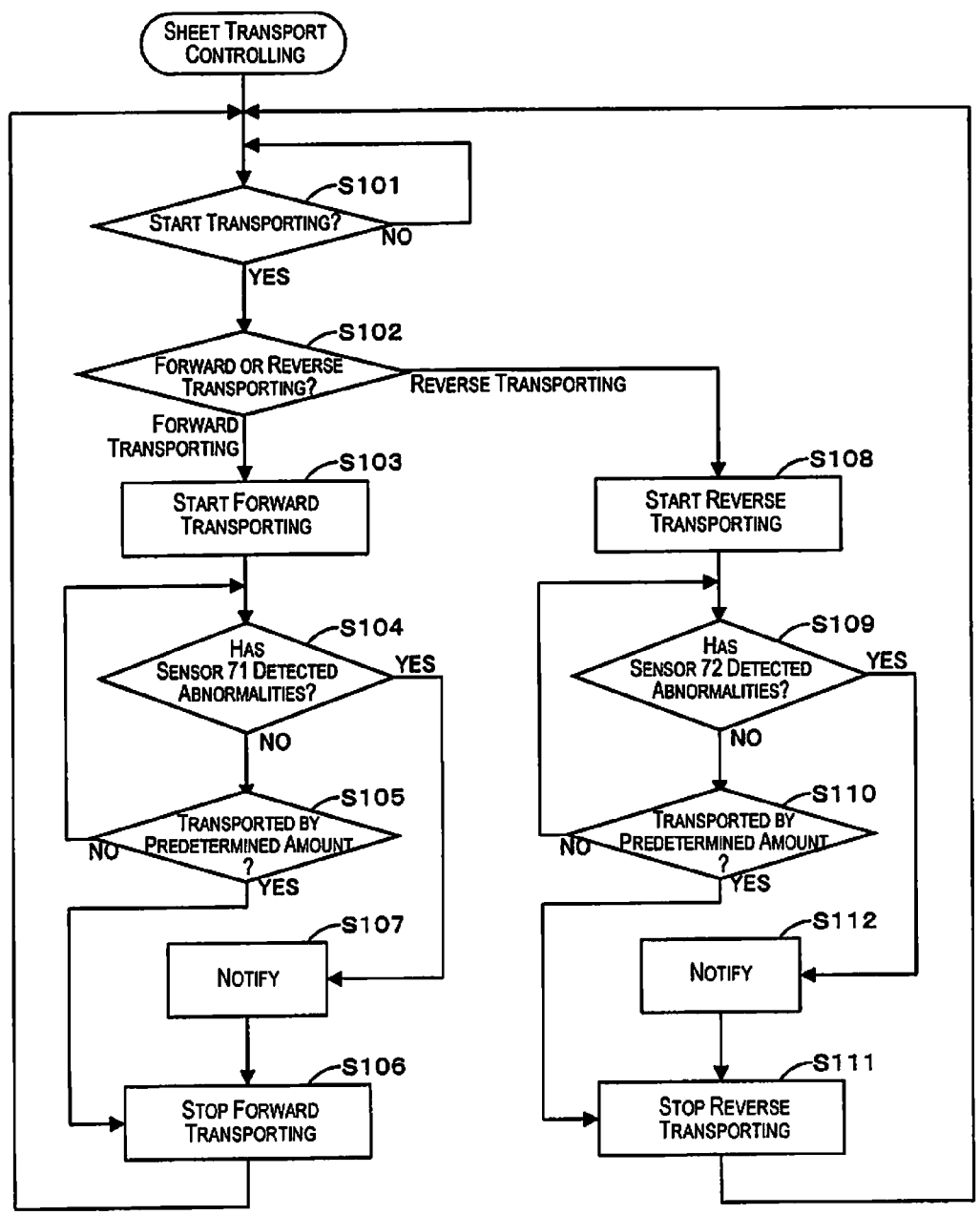
FIG. 4 is a flow chart illustrating one example of sheet transport controlling which is executed by a printer control section.
Figure 5:
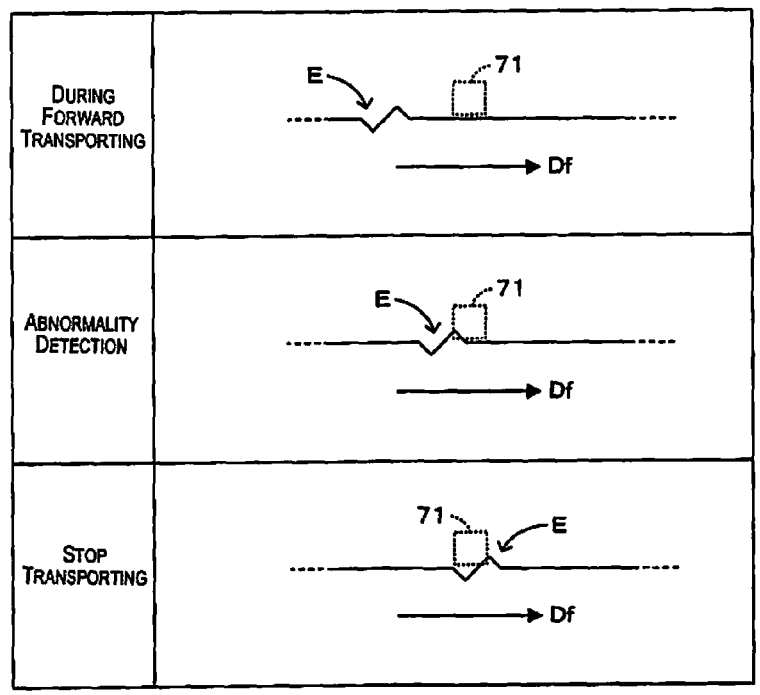
FIG. 5 is a diagram illustrating one example of controlling based on an abnormality sensor while executing forward transporting.
Figure 6:
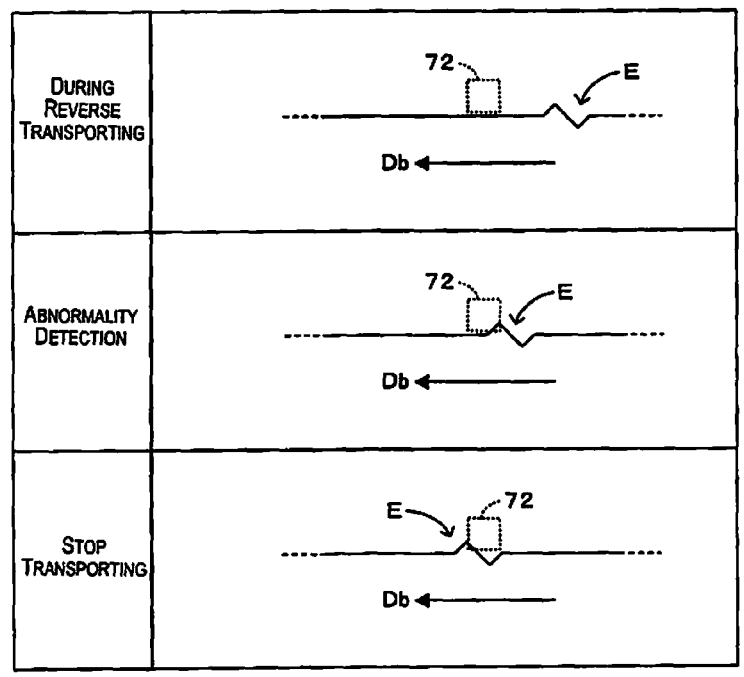
FIG. 6 is a diagram illustrating one example of controlling based on an abnormality sensor while executing reverse transporting.

In particular, in the present embodiment, the printer control section 100 detects the presence or absence of abnormalities on the sheet S using the abnormality sensors 71 and 72 and executes controlling based on the detection results when both executing forward transporting and executing reverse transporting. FIG. 4 is a flow chart illustrating one example of sheet transport controlling which is executed by a printer control section. FIG. 5 is a diagram schematically illustrating one example of controlling based on an abnormality sensor while executing forward transporting. FIG. 6 is a diagram schematically illustrating one example of controlling based on an abnormality sensor while executing reverse transporting. FIG. 5 and FIG. 6 show an example of circumstances where an abnormality E is generated on the sheet S due to wrinkling.

In step S101, it is determined whether or not to start transporting of the sheet S. Then, it is determined in step S102 whether the type of transporting to be started is either forward transporting or reverse transporting in a case where it is determined that transporting of the sheet S is to be started (a case of "YES" in step S101). The process advances to step S103 and forward transporting is started in a case where it is determined that forward transporting is to be started. Furthermore, step S104, where the abnormality sensor 71 monitors whether or not the abnormality E is detected on the sheet S, and step S105, where it is determined whether or not transporting of the sheet S by a predetermined amount is complete, are repeatedly executed after forward transporting is started. Then, the process advances to step S106 and forward transporting stops when transporting of the sheet S by the predetermined amount is completed ("YES" in step S105) without the abnormality E being detected.

On the other hand, as in the example in FIG. 5, the abnormality sensor 71 detects the abnormality E ("YES" in step S104) when the abnormality E on the sheet S comes close to the abnormality sensor 71 from the upstream side in the transport direction Df (in the "during forward transporting" section) and reaches the abnormality sensor 71 (in the "abnormality detection" section) before transporting of the sheet S by the predetermined amount ends. In response to this, the printer control section 100 performs notifying of a user using a notifying section 8 (FIG. 3) (step S107). It is possible for a warning buzzer which generates a sound, a warning light which generates light, a display which performs a warning display for a user, or the like to be used as the notifying section 8. Next, the process advances to step S106, forward transporting stops (in the "stop transporting" section in FIG. 5), and the process returns to step S101.

In addition, the process advances to step S108 and reverse transporting starts in a case where it is determined in step S102 that reverse transporting is to be started. Furthermore, step S109, where the abnormality sensor 72 monitors whether or not the abnormality E is detected on the sheet S, and step S110, where it is determined whether or not transporting of the sheet S by the predetermined amount is complete, are repeatedly executed after reverse transporting is started. Then, the process advances to step S111 and reverse transporting stops when transporting of the sheet S by the predetermined amount is complete ("YES" in step S110) without the abnormality E being detected.

On the other hand, as in the example in FIG. 6, the abnormality E is detected by the abnormality sensor 72 ("YES" in step S109) when the abnormality E on the sheet S comes close to the abnormality sensor 72 from the upstream side in the transport direction Db (in the "during reverse transporting" section) and reaches the abnormality sensor 72 (in the "abnormality detection" section) before transporting of the sheet S by the predetermined amount ends. In response to this, the printer control section 100 performs notifying of a user using the notifying section 8 (FIG. 3) (step S112). Next, the process advances to step S111, reverse transporting stops (in the "stop transporting" section in FIG. 6), and the process returns to step S101.

As described above, in the present embodiment, an image is recorded on the sheet S using the recording heads 51 and 52 while the sheet S is being transported in the transport direction Df. Accordingly, the sheet S where an image is recorded is sent more to the downstream side in the transport direction Df than the recording heads 51 and 52. In contrast to this, the abnormality sensor 72, which detects the presence or absence of abnormalities on the sheet S, is arranged on the downstream side of the heads 51 and 52 in the transport direction Df. Accordingly, it is possible to detect the abnormality E, which is on the sheet S where an image is recorded, using the abnormality sensor 72 when reverse transporting of the sheet S is being carried out. By doing this, in the present embodiment, it is possible to confirm the presence or absence of the abnormality E on the sheet S where an image is recorded.

That is, there are various considerations as causes for the abnormality E being on the sheet S where an image is recorded. For example, there are cases where there is the abnormality E (wrinkling) on the sheet S by the sheet being folded due to a load which is received from the rear driving roller 32 and the nip roller 32n when, for example, the sheet S, where an image is recorded by the recording heads 51 and 52, passes between the rear driving roller 32 and the nip roller 32n. Alternatively, the thermal expansion coefficients for each layer which configures the sheet S are different in a case where the sheet S has a multi-layer structure where the base material where an image is recorded and a separator are adhered using an adhesive agent layer. On the other hand, heat from the curing reaction is generated when an image (ink), which is recorded on the sheet S using the recording heads 51 and 52, is cured by receiving irradiation of light from the UV irradiating devices 61, 62, and 63. For this reason, there are cases where there is the abnormality E (wrinkling) on the sheet S due to the shape of each layer of the sheet S, which is heated due to heat from the curing reaction, changing due to the thermal expansion coefficients which are different from each other. In particular, the abnormality E is more remarkable when a load is received due to wrinkling which is generated in this manner being passed between the rear driving roller 32 and the nip roller 32n.

In addition, in the present embodiment, the abnormality sensor 72 detects the presence or absence of the abnormality E on the sheet S at the rear surface side which is the reverse of the front surface where an image is recorded. That is, the abnormality E, where colliding with the recording heads 51 and 52 is a problem, is the abnormality E which appears on the front surface of the sheet S, but it is possible to detect the abnormality E, which is wrinkling, bending, or tearing of the sheet S, at the rear surface side of the sheet S using the abnormality sensor 72. Moreover, it is advantageous in that it is possible to eliminate the effects (for example, an effect such as a portion of light from the light emitting section 721 being scattered by the image) which are imparted by the image, which is recorded on the front surface of the sheet S, on detection precision of the abnormality sensor 72 due to the presence or absence of the abnormality E being detected on the rear surface side of the sheet S.

In addition, the abnormality sensor 71, which detects the presence or absence of the abnormality E on the sheet S, is provided to be arranged at the upstream side of the heads 51 and 52 in the transport direction Df. With this configuration, it is possible for the presence or absence of the abnormality E on the sheet S where an image is not recorded to be detected using the abnormality sensor 71.

In addition, the printer control section 100 stops reverse transporting of the sheet S when the abnormality sensor 72 detects an abnormality on the sheet S while reverse transporting is being executed. With this configuration, it is possible to suppress colliding of the abnormality E, which is on the sheet S where an image is recorded, with the recording heads 51 and 52.

In addition, the printer control section 100 performs notifying of a user when the abnormality sensor 72 detects an abnormality on the sheet S while reverse transporting is being executed. With this configuration, it is possible for a user to ascertain that there is the abnormality E on the sheet S where an image is recorded and appropriately execute a necessary process for, for example, removing the abnormality E or the like.

As described above, in the embodiment described above, the printer 1 is equivalent to an example of the "image recording apparatus" in the present invention, the feeding shaft 20, the front driving roller 31, the rear driving roller 32, and the winding shaft 40 together function as an example of the "transport section" in the present invention, each of the recording heads 51 and 52 are equivalent to examples of the "heads" in the present invention, the abnormality sensor 72 is equivalent to an example of the "first sensor" in the present invention, the abnormality sensor 71 is equivalent to an example of the "second sensor" in the present invention, the printer control section 100 is equivalent to an example of the "control section" in the present invention, the rear driving roller 32 and the nip roller 32n configure an example of the "pair of rollers" in the present invention, the transport direction Df is equivalent to an example of the "first direction" in the present invention, the transport direction Db is equivalent to an example of the "second direction" in the present invention, the sheet S is equivalent to an example of the "recording medium" in the present invention, the front surface of the sheet S is equivalent to an example of the "first surface" in the present invention, and the rear surface of the sheet S is equivalent to an example of the "second surface" in the present invention.

Here, the present invention is not limited to the embodiment described above and it is possible to add various modifications with regard to the embodiment described above as long as there is no deviating from the gist of the present invention. For example, in the embodiment described above, an image is recorded by discharging UV ink from the recording heads 51 and 52. However, an image may be recorded by discharging water-based ink from the recording heads 51 and 52.

That is, it is easy for there to be wrinkles on the base material of the sheet S, where an image is recorded using water-based ink and for there to be the abnormality E on the sheet S in a case where water-based ink is used on the sheet S which has a paper-based base material. Therefore, it is particularly suitable if the image recording apparatus is configured so that it is possible to detect the abnormality E by adopting the present invention in the same manner as the embodiment described above.

In addition, it is possible to consider a configuration where the sheet S is dried due to the rotation drum 30 which supports the sheet S being heated or the like in a case where water-based ink is used. However, it is easy for there to be wrinkles which accompany heating for drying and for there to be the abnormality E on the sheet S since the thermal expansion coefficients for each layer are different in a case where the sheet S which has a multi-layer structure is used. Therefore, it is particularly suitable if the image recording apparatus is configured so that it is possible to detect the abnormality E by adopting the present invention in the same manner as the embodiment described above.

In addition, in the embodiment described above, the abnormality sensor 72 is arranged at the rear surface side of the sheet S and detects the presence or absence of the abnormality E on the sheet S at the rear surface of the sheet S. However, the abnormality sensor 72 may also be configured to be arranged at the front surface side of the sheet S and to detect the presence or absence of the abnormality E on the sheet S at the front surface of the sheet S.

In addition, detecting abnormalities on the sheet S using the abnormality sensor 72 is not limited to only being carried out during reverse transporting of the sheet S and may be carried out during forward transporting of the sheet S. In a case where abnormalities are detected on the sheet S using the abnormality sensor 72 during forward transporting, notifying of a user may be performed by the notifying section 8 and forward transporting may stop immediately after detection, and it may be stored that there are abnormalities on the sheet S, notifying of a user may be performed by the notifying section 8 and reverse transporting may be prohibited when there is an instruction for reverse transporting of the sheet S.

In addition, the member, which supports the sheet S which is being transported, is also not limited to being cylindrical such as the rotation drum 30 described above. Accordingly, it is possible to use a flat platen which supports the sheet on a flat surface.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image recording apparatus comprising:
   a transport section configured to transport a recording medium in a first direction and a second direction which is a reverse of the first direction;
   a head configured to record an image on the recording medium;
   a first sensor arranged on a downstream side of the head in the first direction and configured to detect presence or absence of abnormality on the recording medium; and
   a control section configured to execute an operation where the image is recorded on the recording medium using the head while the recording medium is being transported in the first direction by the transport section and an operation where the recording medium is transported in the second direction by the transport section such that the recording medium located in a position to oppose the first sensor in a transport path passes through a position to oppose the head in the transport path.

2. The image recording apparatus according to claim 1, wherein
   the head is configured to record the image on a first surface of the recording medium, and the first sensor is configured to detect the presence or absence of the abnormality on the recording medium at a side of a second surface which is a reverse of the first surface of the recording medium.

3. The image recording apparatus according to claim 2, further comprising
   a second sensor arranged on an upstream side of the head in the first direction and configured to detect the presence or absence of the abnormality on the recording medium at a side of the first surface of the recording medium.

4. The image recording apparatus according to claim 1, wherein
   the control section is further configured to stop transporting of the recording medium when the first sensor detects the abnormality on the recording medium while executing the operation where the recording medium is transported in the second direction by the transport section.

5. The image recording apparatus according to claim 1, wherein
   the control section is further configured to perform notifying of a user when the first sensor detects the abnormality on the recording medium while executing the operation where the recording medium is transported in the second direction by the transport section.

6. The image recording apparatus according to claim 1, further comprising
   a pair of rollers configured to interpose the recording medium at a downstream side of the first sensor in the first direction.

7. An image recording method comprising:
   recording an image on a recording medium using a head while the recording medium is being transported in a first direction; and
   transporting the recording medium in a second direction which is a reverse of the first direction,
   presence or absence of abnormality on the recording medium being detected by a sensor arranged on a downstream side of the head in the first direction during the transporting of the recording medium in the second direction,
   in the transporting of the recording medium in the second direction, the recording medium located in a position to oppose the sensor in a transport path passing through a position to oppose the head in the transport path.

\* \* \* \* \*